United States Patent
Kim

(10) Patent No.: US 9,372,561 B2
(45) Date of Patent: Jun. 21, 2016

(54) ELECTRONIC DEVICE, METHOD OF OPERATING THE SAME, AND COMPUTER-READABLE MEDIUM THAT STORES A PROGRAM

(71) Applicant: Samsung Display Co., LTD., Yongin, Gyeonggi-Do (KR)

(72) Inventor: Hwang-Keun Kim, Yongin (KR)

(73) Assignee: Samsung Display Co., Ltd. (KR)

( * ) Notice: Subject to any disclaimer, the term of this patent is extended or adjusted under 35 U.S.C. 154(b) by 158 days.

(21) Appl. No.: 14/156,283

(22) Filed: Jan. 15, 2014

(65) Prior Publication Data

US 2014/0232668 A1    Aug. 21, 2014

(30) Foreign Application Priority Data

Feb. 18, 2013    (KR) ........................ 10-2013-0017137

(51) Int. Cl.
  *G06F 3/041*    (2006.01)
  *G06F 3/0487*    (2013.01)
  *G06F 3/0488*    (2013.01)

(52) U.S. Cl.
  CPC .............. *G06F 3/041* (2013.01); *G06F 3/0487* (2013.01); *G06F 3/04883* (2013.01); *G06F 2203/04803* (2013.01); *G06F 2203/04806* (2013.01)

(58) Field of Classification Search
  CPC ....................................................... G06F 3/041
  See application file for complete search history.

(56) References Cited

U.S. PATENT DOCUMENTS

| | | | |
|---|---|---|---|
| 9,015,640 B2* | 4/2015 | de Leon | 715/863 |
| 2011/0122085 A1* | 5/2011 | Chang | 345/174 |
| 2011/0273383 A1* | 11/2011 | Jeon et al. | 345/173 |
| 2011/0312389 A1 | 12/2011 | Hyun et al. | |
| 2012/0013543 A1* | 1/2012 | Shenfield | 345/173 |

FOREIGN PATENT DOCUMENTS

| | | |
|---|---|---|
| KR | 10-2010-0008959 | 1/2010 |
| KR | 10-2010-0027689 | 3/2010 |
| KR | 10-2010-0115431 | 10/2010 |
| KR | 10-2010-0134339 | 12/2010 |
| KR | 10-2011-0137159 | 12/2011 |

* cited by examiner

*Primary Examiner* — Charles Hicks
(74) *Attorney, Agent, or Firm* — Innovation Counsel LLP

(57) ABSTRACT

An electronic device includes a touch-screen unit which includes a flat surface touch-screen region and a curved surface touch-screen region, and a body unit to which the touch-screen unit is attached. Here, the electronic device determines that a first user command is input when a border between the flat surface touch-screen region and the curved surface touch-screen region is traversed from a first direction, and determines that a second user command is input when the border between the flat surface touch-screen region and the curved surface touch-screen region is traversed from a second direction, where the second direction is opposite to the first direction.

19 Claims, 10 Drawing Sheets

ELECTRONIC DEVICE, METHOD OF OPERATING THE SAME, AND COMPUTER-READABLE MEDIUM THAT STORES A PROGRAM

CROSS-REFERENCE TO RELATED APPLICATION(S)

This application claims priority under 35 USC §119 to Korean Patent Applications No. 10-2013-0017137, filed on Feb. 18, 2013 in the Korean Intellectual Property Office (KIPO), the contents of which are incorporated herein in its entirety by reference.

BACKGROUND

1. Technical Field

Exemplary embodiments relate generally to an electronic device. More particularly, embodiments of the inventive concept relate to an electronic device having a touch-screen unit, a method of operating the electronic device, and a computer-readable medium that stores a program.

2. Description of the Related Art

Recently, an electronic device having a touch-screen unit (e.g., a cellular phone, a smart-phone, a smart-pad, a laptop, a computer, a television, etc) is widely used. Thus, various user interfaces have been suggested for those electronic devices. According to a typical user interface employed in the electronic device, a multi-touch operation (i.e., an operation in which a distance between two points of the touch-screen unit is adjusted while the two points of the touch-screen unit are touched by a user) is mainly performed when the user inputs a user command such as an image zoom-in command, an image zoom-out command, etc. For example, the user may input the image zoom-in command by increasing a distance between two points of the touch-screen unit (i.e., by pulling the two points of the touch-screen unit apart to enlarge a size of the image) while touching the two points of the touch-screen unit. On the other hand, the user may input the image zoom-out command by decreasing a distance between two points of the touch-screen unit (i.e., by squeezing the two points of the touch-screen unit to reduce a size of the image) while touching the two points of the touch-screen unit. However, since the multi-touch operation is required for the user to use two fingers or two hands, the multi-touch operation may be inconvenience for user as a size of the electronic device gets bigger.

SUMMARY

Some exemplary embodiments provide an electronic device capable of providing a user with improved convenience of use when the user inputs a user command.

Some exemplary embodiments provide a method of operating the electronic device.

Some exemplary embodiments provide a computer-readable medium that stores a program capable of providing a user with improved convenience of use when the user inputs a user command.

According to some exemplary embodiments, an electronic device may include a touch-screen unit which includes a flat surface touch-screen region and a curved surface touch-screen region, and a body unit to which the touch-screen unit is attached. Here, the electronic device may determine that a first user command is input when a border between the flat surface touch-screen region and the curved surface touch-screen region is traversed from a first direction, and may determine that a second user command is input when the border between the flat surface touch-screen region and the curved surface touch-screen region is traversed from a second direction, the second direction being opposite to the first direction.

In exemplary embodiments, the touch-screen unit may be flexible, and the flat surface touch-screen region and the curved surface touch-screen region may be integrally manufactured.

In exemplary embodiments, the curved surface touch-screen region may have a convex shape protruding from the flat surface touch-screen region.

In exemplary embodiments, the curved surface touch-screen region may have a concave shape recessed from the flat surface touch-screen region.

In exemplary embodiments, the flat surface touch-screen region and the curved surface touch-screen region may correspond to a main touch-screen region on which an application program is displayed.

In exemplary embodiments, the flat surface touch-screen region may correspond to a main touch-screen region on which an application program is displayed, and the curved surface touch-screen region may correspond to a sub touch-screen region on which at least one command button is displayed.

In exemplary embodiments, the first direction may correspond to a direction from the flat surface touch-screen region to the curved surface touch-screen region.

In exemplary embodiments, the electronic device may determine that the border between the flat surface touch-screen region and the curved surface touch-screen region is traversed from the first direction when the curved surface touch-screen region is touched in a predetermined time after the flat surface touch-screen region is touched.

In exemplary embodiments, the second direction may correspond to a direction from the curved surface touch-screen region to the flat surface touch-screen region.

In exemplary embodiments, the electronic device may determine that the border between the flat surface touch-screen region and the curved surface touch-screen region is traversed from the second direction when the flat surface touch-screen region is touched in a predetermined time after the curved surface touch-screen region is touched.

In exemplary embodiments, the first user command may correspond to an image zoom-in command, and the second user command may correspond to an image zoom-out command.

In exemplary embodiments, the first user command may correspond to a lock command, and the second user command may correspond to an unlock command.

According to some exemplary embodiments, a method of operating an electronic device, where the electronic device includes a flexible touch-screen unit and a body unit to which the flexible touch-screen unit is attached, may include an operation of determining that a first user command is input when a border between a flat surface touch-screen region and a to curved surface touch-screen region of the flexible touch-screen unit is traversed from a first direction, and an operation of determining that a second user command is input when the border between the flat surface touch-screen region and the curved surface touch-screen region is traversed from a second direction, the second direction being opposite to the first direction.

In exemplary embodiments, the first direction may correspond to a direction from the flat surface touch-screen region to the curved surface touch-screen region.

In exemplary embodiments, the border between the flat surface touch-screen region and the curved surface touch-screen region may be determined to be traversed from the first direction when the curved surface touch-screen region is touched in a predetermined time after the flat surface touch-screen region is touched.

In exemplary embodiments, the second direction may correspond to a direction from the curved surface touch-screen region to the flat surface touch-screen region.

In exemplary embodiments, the border between the flat surface touch-screen region and the curved surface touch-screen region may be determined to be traversed from the second direction when the flat surface touch-screen region is touched in a predetermined time after the curved surface touch-screen region is touched.

In exemplary embodiments, the first user command may correspond to an image zoom-in command, and the second user command may correspond to an image zoom-out command.

In exemplary embodiments, the first user command may correspond to a lock command, and the second user command may correspond to an unlock command.

According to some exemplary embodiments, a computer-readable medium that stores a program for operating an electronic device that includes a flexible touch-screen unit and a body unit to which the flexible touch-screen unit is attached may be provided. Here, the program may implement a function of determining that a first user command is input when a border between a flat surface touch-screen region and a curved surface touch-screen region of the flexible touch-screen unit is traversed from a first direction, and a function of determining that a second user command is input when the border between the flat surface touch-screen region and the curved surface touch-screen region is traversed from a second direction, the second direction being opposite to the first direction.

Therefore, an electronic device, a method of operating an electronic device, and a computer-readable medium that stores a program according to exemplary embodiments may provide a user with improved convenience of use because the user can input a user command using a flat surface touch-screen region and a curved surface touch-screen region of a touch-screen unit. Specifically, the electronic device, the method of operating the electronic device, and the computer-readable medium that stores the program may determine that a first user command (e.g., an image zoom-in command) is input when a border between the flat surface touch-screen region and the curved surface touch-screen region is traversed from a first direction, and may determine that a second user command (e.g., an image zoom-out command) is input when the border between the flat surface touch-screen region and the curved surface touch-screen region is traversed from a second direction, where the second direction is opposite to the first direction.

BRIEF DESCRIPTION OF THE DRAWINGS

Illustrative, non-limiting exemplary embodiments will be more clearly understood with reference to the following detailed description and accompanying drawings.

DETAILED DESCRIPTION OF THE EMBODIMENTS

Figure 1:
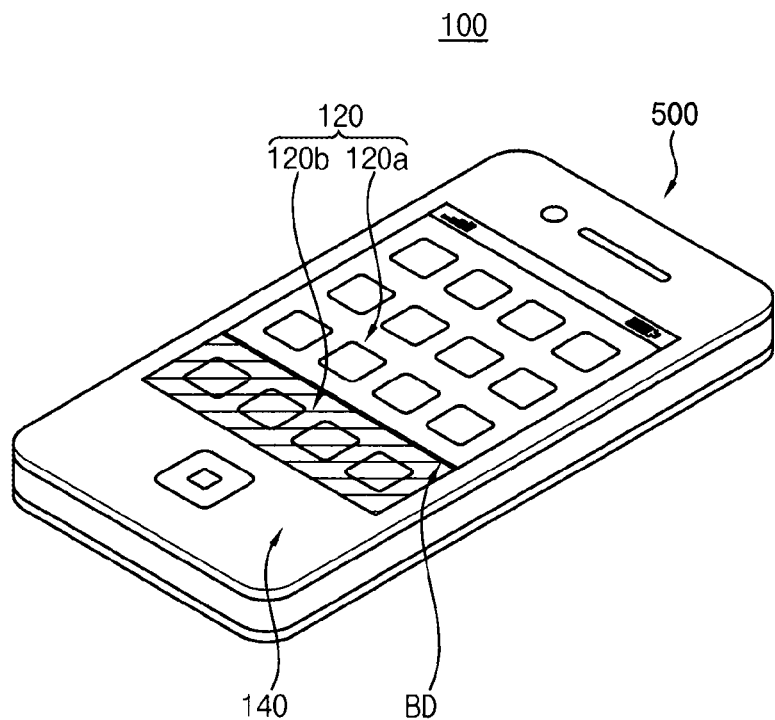
FIG. 1 is a diagram illustrating an electronic device according to exemplary embodiments.

Various exemplary embodiments will be described more fully hereinafter with reference to the accompanying drawings, in which some exemplary embodiments are shown. The present inventive concept may, however, be embodied in many different forms and should not be construed as limited to the exemplary embodiments set forth herein. Rather, these exemplary embodiments are provided so that this disclosure will be thorough and complete, and will fully convey the scope of the present inventive concept to those skilled in the art. In the drawings, the sizes and relative sizes of layers and regions may be exaggerated for clarity. Like numerals refer to like elements throughout.

It will be understood that, although the terms first, second, third etc. may be used herein to describe various elements, these elements should not be limited by these terms. These terms are used to distinguish one element from another. Thus, a first element discussed below could be termed a second element without departing from the teachings of the present inventive concept. As used herein, the term "and/or" includes any and all combinations of one or more of the associated listed items.

It will be understood that when an element is referred to as being "connected" or "coupled" to another element, it can be directly connected or coupled to the other element or formed with intervening elements. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular exemplary embodiments only and is not intended to limit the present inventive concept. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and should not be interpreted in an idealized or overly formal sense unless expressly so defined herein.

Figure 2:
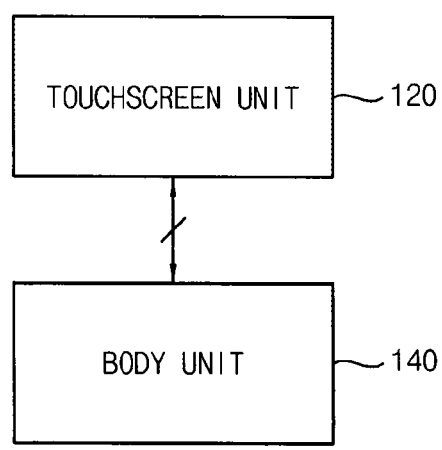
FIG. 2 is a block diagram illustrating an example of an electronic device of FIG. 1.

FIG. 1 is a diagram illustrating an electronic device according to exemplary embodiments. FIG. 2 is a block diagram illustrating an example of an electronic device of FIG. 1.

Referring to FIGS. 1 and 2, the electronic device 100 may include a touch-screen unit 120 and a body unit 140 to which the touch-screen unit 120 is attached. Here, the touch-screen unit 120 may include a display device and a touch sensor device. Although it is illustrated in FIG. 1 that the electronic device 100 is a smart-phone, kinds of the electronic devices 100 are not limited thereto. For example, the electronic device 100 may be a cellular phone, a smart-pad, a television, a laptop, etc. In addition, a shape of the electronic device 100 is not limited to a shape of the electronic device 100 illustrated in FIG. 1.

The touch-screen unit 120 may include a flat surface touch-screen region 120a and a curved surface touch-screen region 120b. The touch-screen unit 120 may be flexible (i.e., flexible touch-screen unit). Thus, the flat surface touch-screen region 120a and the curved surface touch-screen region 120b may be integrally manufactured. The flat surface touch-screen region 120a and the curved surface touch-screen region 120b may be formed of a same material and formed in one piece. In one exemplary embodiment, the curved surface touch-screen region 120b may have a convex shape protruding from the flat surface touch-screen region 120a. In this case, the curved surface touch-screen region 120b may protrude from a front surface of the electronic device 100. In another exemplary embodiment, the curved surface touch-screen region 120b may have a concave shape recessed from the flat surface touch-screen region 120a. In this case, the curved surface touch-screen region 120b may be recessed from the front surface of the electronic device 100. Meanwhile, the touch-screen unit 120 may display application programs and command buttons for executing the application programs. In one exemplary embodiment, as illustrated in FIG. 1, the flat surface touch-screen region 120a and the curved surface touch-screen region 120b may correspond to a main touch-screen region on which the application programs are displayed (i.e., executed). In this case, the application programs may be displayed on the curved surface touch-screen region 120b having the convex shape or the concave shape as well as the flat surface touch-screen region 120a in the electronic device 100. In another exemplary embodiment, the flat surface touch-screen region 120a may correspond to a main touch-screen region on which the application program is displayed, and the curved surface touch-screen region 120b may correspond to a sub touch-screen region on which at least one command button is displayed. As illustrated in FIG. 1, the curved surface touch-screen region 120b may be located at an upper side space of a front physical button (e.g., a home button of a smart-phone) of the electronic device 100. In some exemplary embodiments, the curved surface touch-screen region 120b may be located at a left side space and a right side space of the front physical button of the electronic device 100.

The electronic device 100 may determine that a first user command is input when a border BD between the flat surface touch-screen region 120a and the curved surface touch-screen region 120b is traversed from a first direction, and may determine that a second user command is input when the border BD between the flat surface touch-screen region 120a and the curved surface touch-screen region 120b is traversed from a second direction, where the second direction is opposite to the first direction. In exemplary embodiments, the first direction may be a direction from the flat surface touch-screen region 120a to the curved surface touch-screen region 120b. For example, the electronic device 100 may determine that the border BD between the flat surface touch-screen region 120a and the curved surface touch-screen region 120b is traversed from the first direction if the curved surface touch-screen region 120b is touched in a predetermined time after the flat surface touch-screen region 120a is touched (i.e., a touch-and-drag operation is performed). In addition, the second direction may be a direction from the curved surface touch-screen region 120b to the flat surface touch-screen region 120a. For example, the electronic device 100 may determine that the border BD between the flat surface touch-screen region 120a and the curved surface touch-screen region 120b is traversed from the second direction if the flat surface touch-screen region 120a is touched in a predetermined time after the curved surface touch-screen region 120b is touched (i.e., the touch-and-drag operation is performed). Although it is described above that the first direction is a direction from the flat surface touch-screen region 120a to the curved surface touch-screen region 120b, and the second direction is a direction from the curved surface touch-screen region 120b to the flat surface touch-screen region 120a, the present inventive concept is not limited thereto. That is, the first direction may be a direction from the curved surface touch-screen region 120b to the flat surface touch-screen region 120a, and the second direction may be a direction from the flat surface touch-screen region 120a to the curved surface touch-screen region 120b.

In one exemplary embodiment, the first user command may be an image zoom-in command, and the second user command may be an image zoom-out command In this case, the electronic device 100 may determine that the image zoon-in command is input when the border BD between the flat surface touch-screen region 120a and the curved surface touch-screen region 120b is traverse from the first direction. Thus, the electronic device 100 may enlarge a size of an image that is displayed on the touch-screen unit 120. In addition, the electronic device 100 may determine that the image zoon-out command is input when the border BD between the flat surface touch-screen region 120a and the curved surface touch-screen region 120b is traversed from the second direction, where the second direction is opposite to the first direction. Thus, the electronic device 100 may reduce a size of the image that is displayed on the touch-screen unit 120. In another exemplary embodiment, the first user command may be a lock command, and the second user command may be an unlock command In this case, the electronic device 100 may determine that the lock command is input when the border BD between the flat surface touch-screen region 120a and the curved surface touch-screen region 120b is traverse from the first direction. Thus, the electronic device 100 may lock the touch-screen unit 120. In addition, the electronic device 100 may determine that the unlock command is input when the border BD between the flat surface touch-screen region 120a and the curved surface touch-screen region 120b is traversed from the second direction, where the second direction is opposite to the first direction. Thus, the electronic device 100 may unlock the touch-screen unit 120. However, the first user command and the second user command are not limited thereto. The first user command and the second user command may be variously set according to requirements of the electronic device 100 (e.g., a power-on command and a power-off command, etc).

As described above, the touch-screen unit 120 may be attached to the body unit 140. Since the touch-screen unit 120 includes the display device and the touch sensor device, the body unit 140 may include at least one controller (i.e., a display controller and a touch sensor controller). Here, the controller may control a display function and a touch sensor function of the touch-screen unit 120. hi addition, the body unit 140 may include an application processor, a plurality of sensors, a memory device, a storage device, a plurality of function devices. The application processor may perform various computing functions to control an overall operation of the electronic device 100. For example, the application processor may be a micro-processor, a central processing unit (CPU), etc. The sensors may perform various sensing operations of the electronic device 100. For example, the sensors may include a gyro sensor that measures a rotating angular speed, an acceleration sensor that measures a speed and a momentum, a geomagnetic field sensor that acts as a compass, a barometer sensor that measures an altitude, a grip sensor that determines whether a mobile device is gripped by a user, a gesture-proximity-illumination sensor that performs various operations such as a motion recognition, a proximity detection, an illumination measurement, etc, and a temperature-humidity sensor that measures a temperature and a humidity. However, kinds of the sensors are not limited thereto. The memory device may store data for operations of the electronic device 100. For example, the memory device may include a volatile semiconductor memory device such as a dynamic random access memory (DRAM) device, a static random access memory (SRAM) device, a mobile DRAM device, etc, and/or a non-volatile semiconductor memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, etc. The storage device may include a solid state drive (SSD) device, a hard disk drive (HDD) device, a CD-ROM device, etc.

In addition, the function devices may perform various operations of the electronic device 100. For example, the function devices may include a camera device that performs a camera function, a communication device that performs a communication function (e.g., code division multiple access (CDMA) module, long term evolution (LTE) module, radio frequency (RF) module, ultra wideband (UWB) module, wireless local area network (WLAN) module, worldwide interoperability for microwave access (WIMAX) module, etc), a global positioning system (GPS) device, a microphone (MIC) device, a speaker device, etc. However, kinds of the function devices included in the electronic device 100 are not limited thereto. As described above, the electronic device 100 may provide a user with improved convenience of use because the user can input the user command (e.g., the image zoom-in command, the image zoom-out command, the lock command, the unlock command, etc) using the flat surface touch-screen region 120a and the curved surface touch-screen region 120b of the touch-screen unit 120. Specifically, the electronic device 100 may determine that the first user command is input when the border BD between the flat surface touch-screen region 120a and the curved surface touch-screen region 120b is traversed from the first direction, and may determine that the second user command is input when the border BD between the flat surface touch-screen region 120a and the curved surface touch-screen region 120b is traversed from the second direction, where the second direction is opposite to the first direction. In addition, the electronic device 100 may enable the user to accurately input the user command because the user can sense (i.e., feel) a step-height in the border BD between the flat surface touch-screen region 120a and the curved surface touch-screen region 120b when the user uses the electronic device 100 such as a smart-phone, a smart-pad, a laptop, etc.

Figure 3:
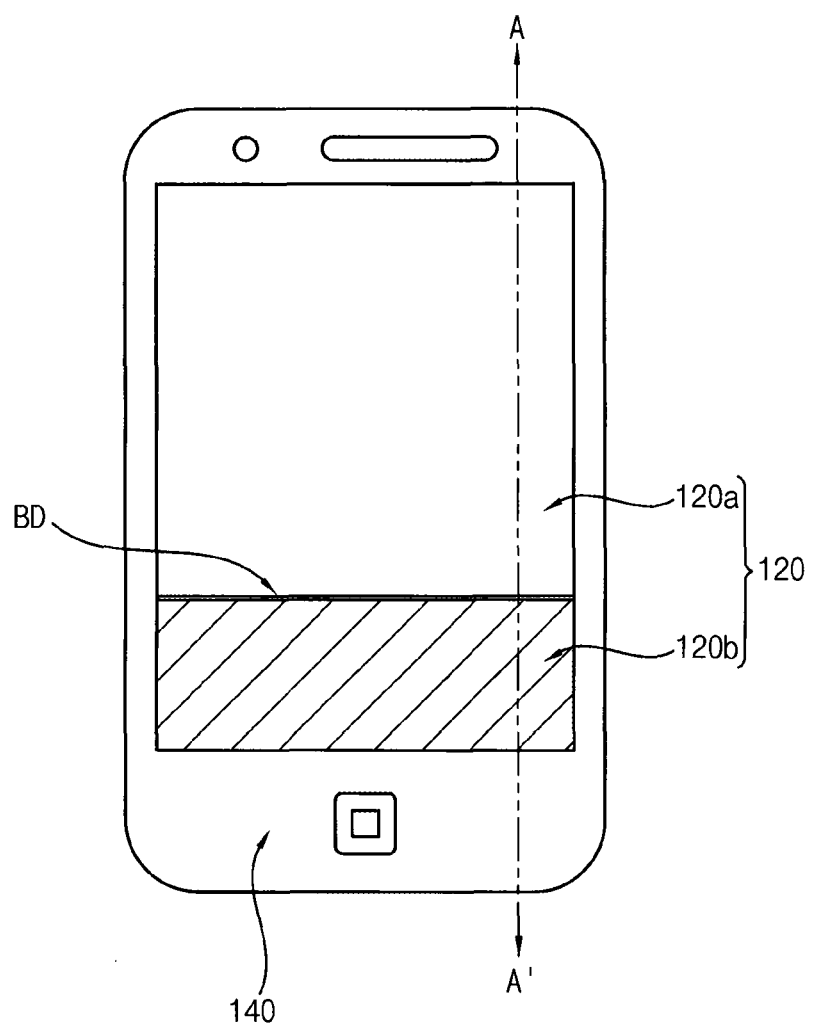
FIG. 3 is a diagram illustrating an example in which a touch-screen unit of an electronic device of FIG. 1 includes a flat surface touch-screen region and a curved surface touch-screen region.
Figure 4A:
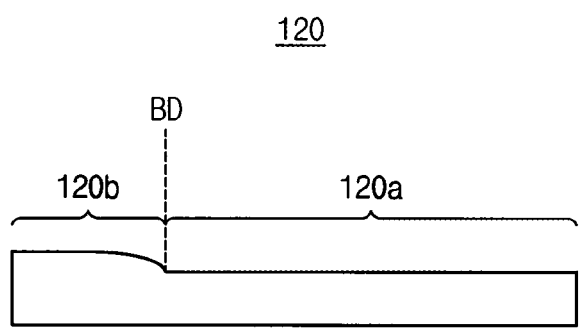
FIGS. 4A and 4B are cross-sectional views that are taken along a line A-A' of FIG. 3 when a curved surface touch-screen region has a convex shape with respect to a flat surface touch-screen region.
Figure 4B:
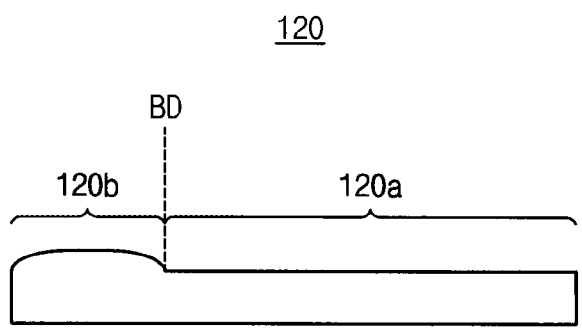
Figure 5A:
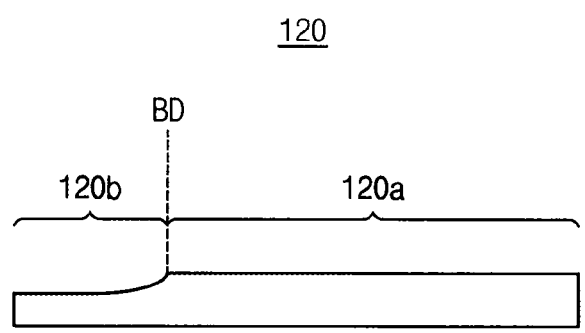
FIGS. 5A and 5B are cross-sectional views that are taken along a line A-A' of FIG. 3 when a curved surface touch-screen region has a concave shape with respect to a flat surface touch-screen region.
Figure 5B:
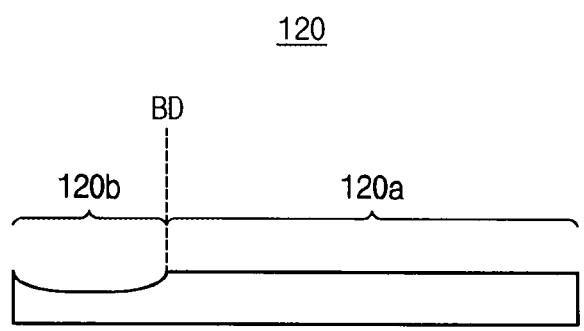

FIG. 3 is a diagram illustrating an example in which a touch-screen unit of an electronic device of FIG. 1 includes a flat surface touch-screen region and a curved surface touch-screen region. FIGS. 4A and 4B are cross-sectional views that are taken along a line A-A' of FIG. 3 when a curved surface touch-screen region has a convex shape protruding from a flat surface touch-screen region. FIGS. 5A and 5B are cross-sectional views that are taken along a line A-A' of FIG. 3 when a curved surface touch-screen region has a concave shape recessed from a flat surface touch-screen region.

Referring to FIGS. 3 through 5B, the touch-screen unit 120 of the electronic device 100 of FIG. 1 may include the flat surface touch-screen region 120a and the curved surface touch-screen region 120b. The curved surface touch-screen region 120b has a convex shape protruding from the flat surface touch-screen region 120a or a concave shape recessed from the flat surface touch-screen region 120a. Thus, a step-height in the border BD between the flat surface touch-screen region 120a and the curved surface touch-screen region 120b may exist in the touch-screen unit 120 of the electronic device 100.

Specifically, as illustrated in FIGS. 4A and 4B, the curved surface touch-screen region 120b may have a convex shape protruding from the flat surface touch-screen region 120a. In this case, the curved surface touch-screen region 120b may protrude from a front surface of the electronic device 100. On the other hand, as illustrated in FIGS. 5A and 5B, the curved surface touch-screen region 120b may have a concave shape recessed from the flat surface touch-screen region 120a. In this case, the curved surface touch-screen region 120b may be recessed from the front surface of the electronic device 100. As a result, the step-height in the border BD between the flat surface touch-screen region 120a and the curved surface touch-screen region 120b may exist in the touch-screen unit 120 of the electronic device 100. Accordingly, a user may accurately input a user command because the user can sense (i.e., feel) the step-height in the border BD between the flat surface touch-screen region 120a and the curved surface touch-screen region 120b when the user uses the electronic device 100. In one exemplary embodiment, the flat surface touch-screen region 120a and the curved surface touch-screen region 120b may correspond to a main touch-screen region on which an application program is displayed (i.e., executed). In another exemplary embodiment, the flat surface touch-screen region 120a may correspond to a main touch-screen region on which the application program is displayed, and the curved surface touch-screen region 120b may correspond to a sub touch-screen region on which at least one command button is displayed. As illustrated in FIG. 3, the curved surface touch-screen region 120b may be located at an upper side space of a front physical button (e.g., a home button of a smart-phone) of the electronic device 100. However, a shape of the electronic device 100 is not limited to a shape of the electronic device 100 illustrated in FIG. 3. In some exemplary embodiments, the curved surface touch-screen region 120b may be located at a left side space and a right side space of the front physical button of the electronic device 100. In some exemplary embodiments, when the electronic device 100 is a smart-phone, the front physical button of the electronic device 100 may be omitted. In some exemplary embodiments, when the electronic device 100 is a smart-phone, the electronic device 100 may include a plurality of front physical buttons. Although it is illustrated in FIG. 3 that the flat surface touch-screen region 120a and the curved surface touch-screen region 120b are arranged from top to bottom, the flat surface touch-screen region 120a and the curved surface touch-screen region 120b may be arranged side by side. Therefore, it should be understood that the present inventive concept is applied to any shape of the electronic device 100 having the touch-screen unit 120 that includes the flat surface touch-screen region 120a and the curved surface touch-screen region 120b.

Figure 6A:
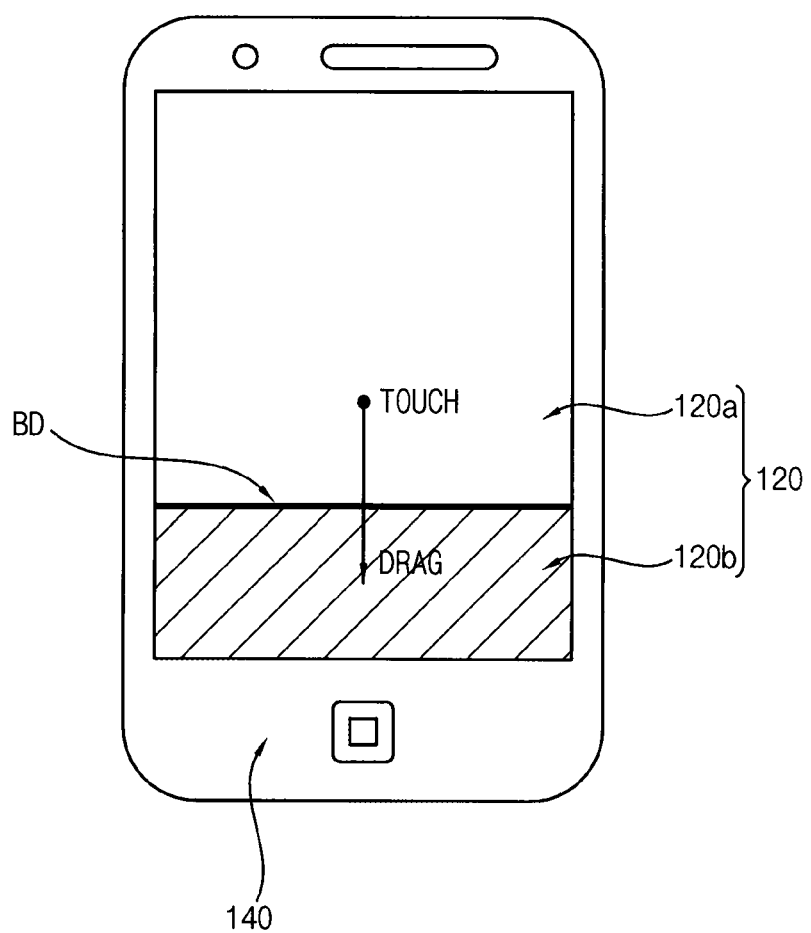
FIG. 6A is a diagram illustrating an example in which a first user command is input to an electronic device of FIG. 1.
Figure 6B:
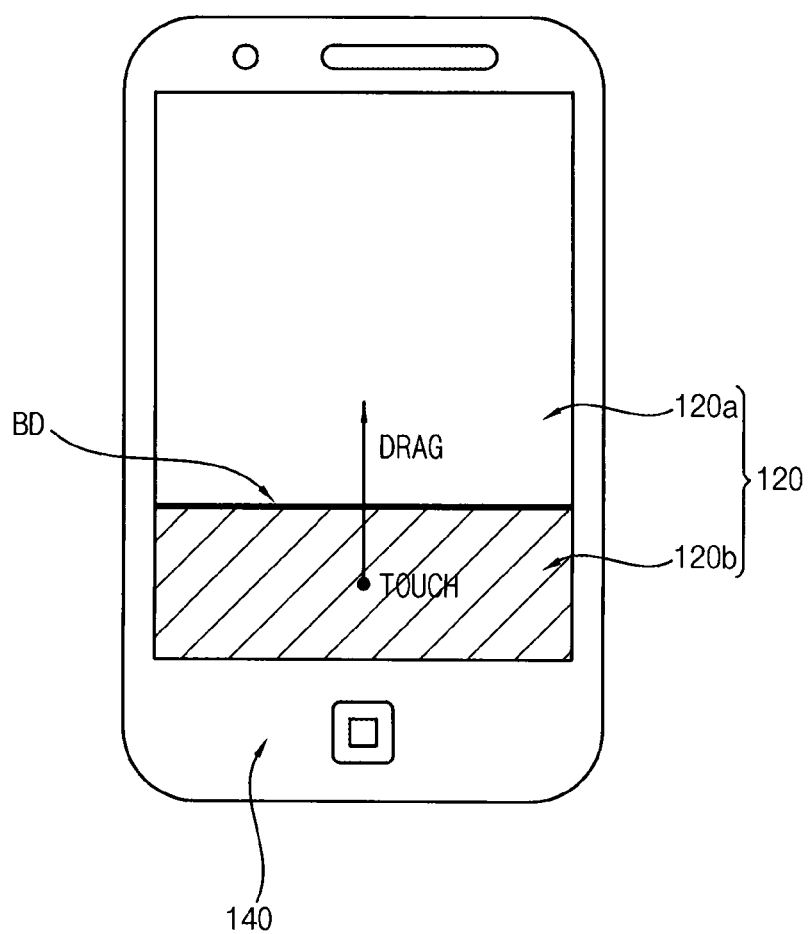
FIG. 6B is a diagram illustrating an example in which a second user command is input to an electronic device of FIG. 1.

FIG. 6A is a diagram illustrating an example in which a first user command is input to an electronic device of FIG. 1. FIG. 6B is a diagram illustrating an example in which a second user command is input to an electronic device of FIG. 1.

Referring to FIGS. 6A and 6B, it is illustrated that a first user command and a second user command are input to the electronic device 100 of FIG. 1. Specifically, the electronic device 100 may determine that the first user command is input when a border BD between a to flat surface touch-screen region 120a and a curved surface touch-screen region 120b is traversed from a first direction. Here, as illustrated in FIG. 6A, the first direction may be a direction from the flat surface touch-screen region 120a to the curved surface touch-screen region 120b. For example, the electronic device 100 may determine that the border BD between the flat surface touch-screen region 120a and the curved surface touch-screen region 120b is traversed from the first direction if the curved surface touch-screen region 120b is touched in a predetermined time after the flat surface touch-screen region 120a is touched (i.e., a touch-and-drag operation is performed) (i.e., indicated as TOUCH and DRAG in FIG. 6A). In addition, as illustrated in FIG. 6B, the second direction may be a direction from the curved surface touch-screen region 120b to the flat surface touch-screen region 120a. For example, the electronic device 100 may determine that the border BD between the flat surface touch-screen region 120a and the curved surface touch-screen region 120b is traversed from the second direction if the flat surface touch-screen region 120a is touched in a predetermined time after the curved surface touch-screen region 120b is touched (i.e., the touch-and-drag operation is performed) (i.e., indicated as TOUCH and DRAG in FIG. 6B).

In one exemplary embodiment, the electronic device 100 may determine that an image zoon-in command is input when the border BD between the flat surface touch-screen region 120a and the curved surface touch-screen region 120b is traversed from the first direction. Thus, the electronic device 100 may enlarge a size of an image that is displayed on the touch-screen unit 120. In addition, the electronic device 100 may determine that an image zoon-out command is input when the border BD between the flat surface touch-screen region 120a and the curved surface touch-screen region 120b is traversed from the second direction. Thus, the electronic device 100 may reduce a size of the image that is displayed on the touch-screen unit 120. In another exemplary embodiment, the electronic device 100 may determine that a lock command is input when the border BD between the flat surface touch-screen region 120a and the curved surface touch-screen region 120b is traversed from the first direction. Thus, the electronic device 100 may lock the touch-screen unit 120. In addition, the electronic device 100 may determine that an unlock command is input when the border BD between the flat surface touch-screen region 120a and the curved surface touch-screen region 120b is traversed from the second direction. Thus, the electronic device 100 may unlock the touch-screen unit 120. However, the first user command and the second user command are not limited thereto. Therefore, the first user command and the second user command may be variously set according to requirements of the electronic device 100 (e.g., a power-on command and a power-off command etc).

Figure 7:
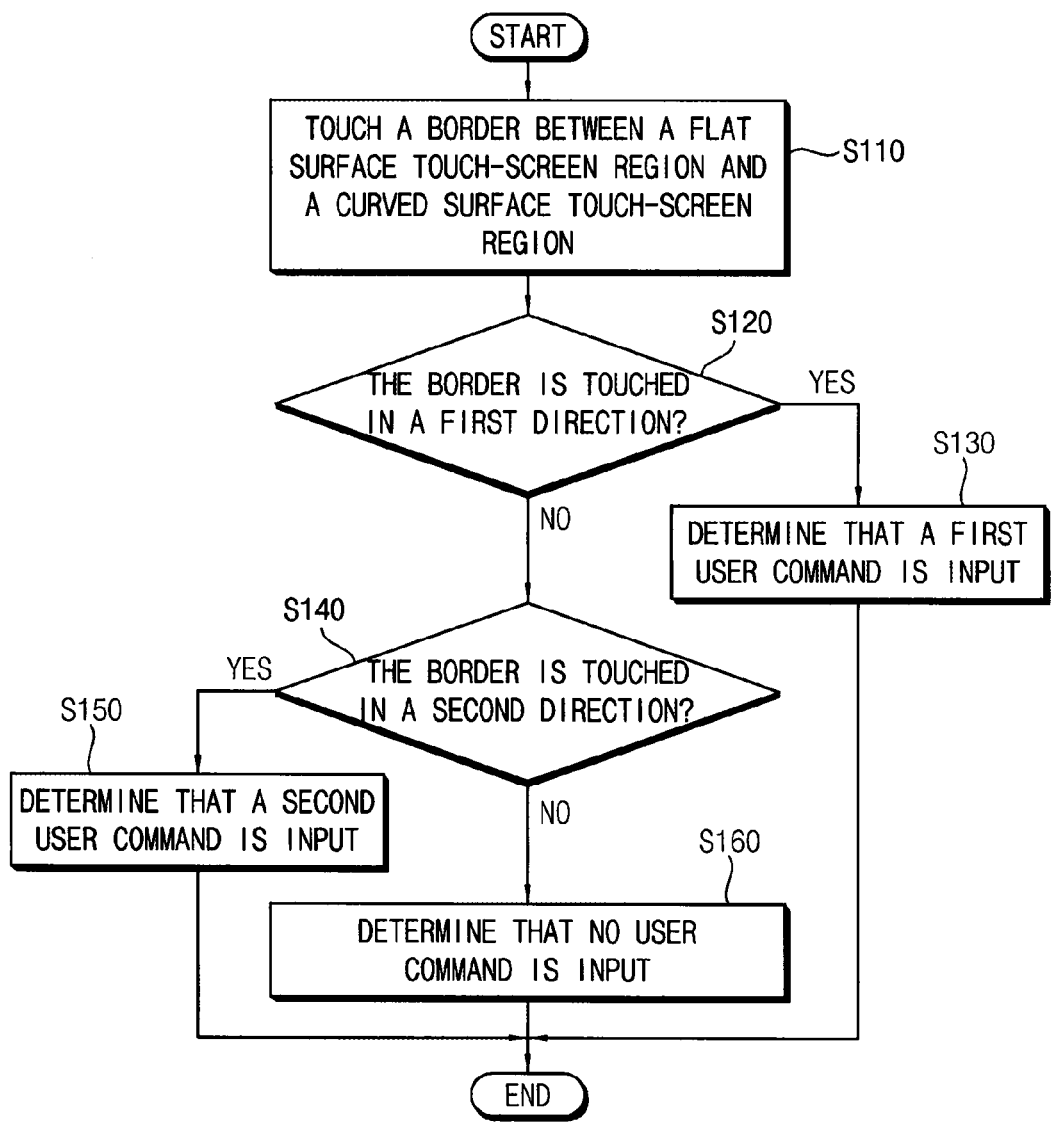
FIG. 7 is a flow chart illustrating a method of operating an electronic device according to exemplary embodiments.

FIG. 7 is a flow chart illustrating a method of operating an electronic device according to exemplary embodiments.

Referring to FIG. 7, the method of FIG. 7 may operate an electronic device that includes a touch-screen unit and a body unit to which the touch-screen unit is attached. Here, the touch-screen unit may include a flat surface touch-screen region and a curved surface touch-screen region. In exemplary embodiments, the touch-screen unit may be flexible (i.e., a flexible touch-screen unit), and thus the flat surface touch-screen region and the curved surface touch-screen region may be integrally manufactured. The touch-screen unit may be flexible (i.e., a flexible touch-screen unit), and thus the flat surface touch-screen region and the curved surface touch-screen region may be formed of a same material and formed in one piece. Specifically, the method of FIG. 7 may check whether a border between the flat surface touch-screen region and the curved surface touch-screen region is traverse from a first direction (S120) when the border between the flat surface touch-screen region and the curved surface touch-screen region is touched (S110). Here, if the border between the flat surface touch-screen region and the curved surface touch-screen region is traversed from the first direction, the method of FIG. 7 may determine that a first user command (e.g., an image zoom-in command, a lock command, etc) is input (S130). On the other hand, if the border between the flat surface touch-screen region and the curved surface touch-screen region is not traversed from the first direction, the method of FIG. 7 may check whether the border between the flat surface touch-screen region and the curved surface touch-screen region is traversed from a second direction (S140). Here, if the border between the flat surface touch-screen region and the curved surface touch-screen region is traversed from the second direction, the method of FIG. 7 may determine that a second user command (e.g., an image zoom-out command, an unlock command, etc) is input (S150). On the other hand, if the border between the flat surface touch-screen region and the curved surface touch-screen region is not traversed from the second direction, the method of FIG. 7 may determine that no user command is input (S160). As described above, the method of FIG. 7 may provide a user with improved convenience of use because the user can input the first and second user commands using the flat surface touch-screen region and the curved surface touch-screen region of the touch-screen unit.

Figure 8:
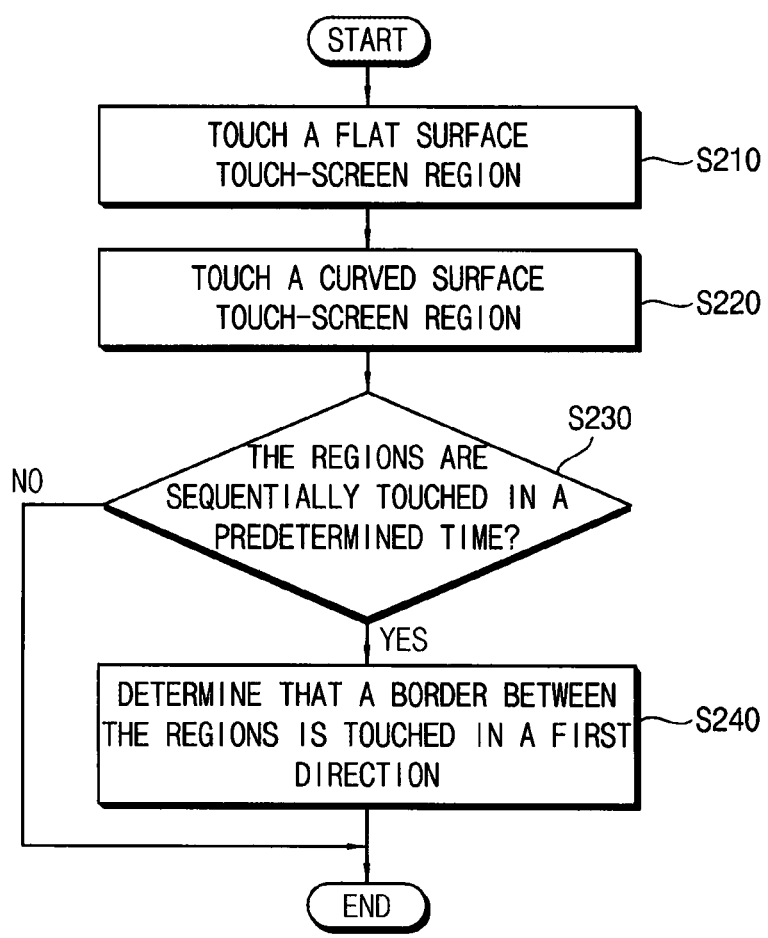
FIG. 8 is a flow chart illustrating an example in which a method of FIG. 7 determines that a border between a flat surface touch-screen region and a curved surface touch-screen region is traversed from a first direction.

FIG. 8 is a flow chart illustrating an example in which a method of FIG. 7 determines that a border between a flat surface touch-screen region and a curved surface touch-screen region is traversed from a first direction.

Referring to FIG. 8, the method of FIG. 7 may check whether a flat surface touch-screen region and a curve surface touch-screen region of a touch-screen unit are sequentially touched in a predetermined time (S230) when the curved surface touch-screen region is touched (S220) after the flat surface touch-screen region is touched (S210). Here, if the flat surface touch-screen region and the curve surface touch-screen region are sequentially touched in the predetermined time, the method of FIG. 7 may determine that a border between the flat surface touch-screen region and the curve surface touch-screen region is traversed from a first direction (S240). Thus, the method of FIG. 7 may determine that a first user command (e.g., an image zoom-in command, a lock command, etc) is input. On the other hand, if the flat surface touch-screen region and the curve surface touch-screen region are not sequentially touched in the predetermined time, the method of FIG. 7 may determine that the border between the flat surface touch-screen region and the curve surface touch-screen region is not traversed from the first direction. In other words, the method of FIG. 7 may determine that the border between the flat surface touch-screen region and the curve surface touch-screen region is traversed from the first direction if the curved surface touch-screen region is touched in the predetermined time after the flat surface touch-screen region is touched (i.e., a touch-and-drag operation is performed). However, a way of determining whether the border between the flat surface touch-screen region and the curve surface touch-screen region is traversed from the first direction is not limited thereto.

Figure 9:
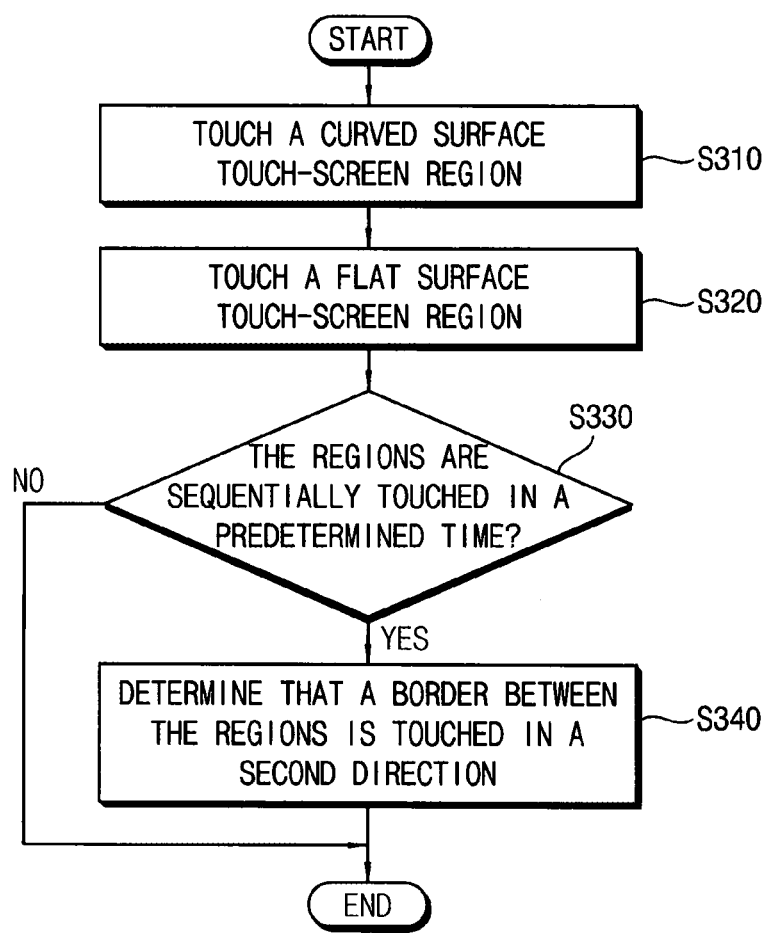
FIG. 9 is a flow chart illustrating an example in which a method of FIG. 7 determines that a border between a flat surface touch-screen region and a curved surface touch-screen region is traversed from a second direction.

FIG. 9 is a flow chart illustrating an example in which a method of FIG. 7 determines that a border between a flat surface touch-screen region and a curved surface touch-screen region is traversed from a second direction.

Referring to FIG. 9, the method of FIG. 7 may check whether a flat surface touch-screen region and a curve surface touch-screen region of a touch-screen unit are sequentially touched in a predetermined time (S330) when the flat surface touch-screen region is touched (S320) after the curved surface touch-screen region is touched (S310). Here, if the flat surface touch-screen region and the curve surface touch-screen region are sequentially touched in the predetermined time, the method of FIG. 7 may determine that a border between the flat surface touch-screen region and the curve surface touch-screen region is traversed from a second direction (S340). Thus, the method of FIG. 7 may determine that a second user command (e.g., an image zoom-out command, an unlock command, etc) is input. On the other hand, if the flat surface touch-screen region and the curve surface touch-screen region are not sequentially touched in the predetermined time, the method of FIG. 7 may determine that the border between the flat surface touch-screen region and the curve surface touch-screen region is not traversed from the second direction. In other words, the method of FIG. 7 may determine that the border between the flat surface touch-screen region and the curve surface touch-screen region is traversed from the second direction if the flat surface touch-screen region is touched in the predetermined time after the curved surface touch-screen region is touched (i.e., a touch-and-drag operation is performed). However, a way of determining whether the border between the flat surface touch-screen region and the curve surface touch-screen region is traversed from the second direction is not limited thereto.

Figure 10:
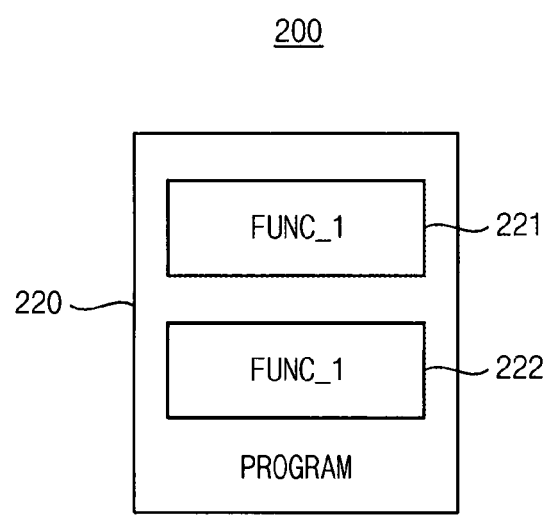
FIG. 10 is a block diagram illustrating a computer-readable medium that stores a program according to exemplary embodiments.

FIG. 10 is a block diagram illustrating a computer-readable medium that stores a program according to exemplary embodiments.

Referring to FIG. 10, a computer-readable medium 200 may store a program 220 for operating an electronic device that includes a flexible touch-screen unit and a body unit to which the flexible touch-screen unit is attached, where the program 220 implements a function 221 of determining that a first user command is input when a border between a flat surface touch-screen region and a curved surface touch-screen region of the flexible touch-screen unit is traversed from a first direction, and a function 222 of determining that a second user command is input when the border between the flat surface touch-screen region and the curved surface touch-screen region is traversed from a second direction that is opposite to the first direction. As described above, the first direction may be a direction from the flat surface touch-screen region to the curved surface touch-screen region, and the second direction may be a direction from the curved surface touch-screen region to the flat surface touch-screen region. The computer-readable medium 200 that stores the program 220 may determine that the first user command (e.g., an image zoon-in command, a lock command, etc) is input when the border between the flat surface touch-screen region and the curved surface touch-screen region is traversed from the first direction, and may determine that the second user command (e.g., an image zoon-out command, an unlock command, etc) is input when the border between the flat surface touch-screen region and the curved surface touch-screen region is traversed from the second direction. Therefore, the computer-readable medium 200 that stores the program 220 may provide a user with improved convenience of use because the user can input the user command using the flat surface touch-screen region and the curved surface touch-screen region of the flexible touch-screen unit. Since these are described above, duplicated description will not be repeated.

The present inventive concept may be applied to any electronic device (e.g., a mobile device) that includes a touch-screen unit. For example, the present inventive concept may be applied to a cellular phone, a smart-phone, a smart-pad, a personal digital assistants (PDA), a portable multimedia player (PMP), an MP3 player, a television, a computer monitor, a laptop, a digital camera, a camcorder, a game console, etc.

The foregoing is illustrative of exemplary embodiments and should not be used to limit scope of the inventive concept. Although a few exemplary embodiments have been described, those skilled in the art will readily appreciate that many modifications are possible in the exemplary embodiments without materially departing from the novel teachings and advantages of the present inventive concept. Accordingly, all such modifications are intended to be included within the scope of the present inventive concept as defined in the claims. Therefore, it is to be understood that the foregoing is illustrative of various exemplary embodiments and should not be used to construe appended claims to the specific exemplary embodiments disclosed, and that modifications to the disclosed exemplary embodiments, as well as other exemplary embodiments, are intended to be included within the scope of the appended claims.

What is claimed is:

1. An electronic device comprising:
a touch-screen unit including a display device and a touch sensor device, the touch sensor device including a flat surface touch-screen region and a curved surface touch-screen region having a border between the flat surface touch-screen region and the curved surface touch-screen region, wherein an image is displayed through the flat surface touch-screen region and the curved surface touch-screen region; and a body unit to which the touch-screen unit is attached,
wherein the electronic device determines that a first user command is input when the border between the flat surface touch-screen region and the curved surface touch-screen region is traversed from a first direction, and determines that a second user command is input when the border between the flat surface touch-screen region and the curved surface touch-screen region is traversed from a second direction, the second direction being opposite to the first direction.

2. The device of claim 1, wherein the touch-screen unit is flexible, and the flat surface touch-screen region and the curved surface touch-screen region are integrally manufactured.

3. The device of claim 2, wherein the curved surface touch-screen region has a convex shape protruding from the flat surface touch-screen region.

4. The device of claim 2, wherein the curved surface touch-screen region has a concave shape recessed from the flat surface touch-screen region.

5. The device of claim 2, wherein the flat surface touch-screen region and the curved surface touch-screen region correspond to a main touch-screen region on which an application program is displayed.

6. The device of claim 2, wherein the flat surface touch-screen region corresponds to a main touch-screen region on which an application program is displayed, and the curved surface touch-screen region corresponds to a sub touch-screen region on which at least one command button is displayed.

7. The device of claim 1, wherein the first direction corresponds to a direction from the flat surface touch-screen region to the curved surface touch-screen region.

8. The device of claim 7, wherein the electronic device determines that the border between the flat surface touch-screen region and the curved surface touch-screen region is traversed from the first direction when the curved surface touch-screen region is touched in a predetermined time after the flat surface touch-screen region is touched.

9. The device of claim 1, wherein the second direction corresponds to a direction from the curved surface touch-screen region to the flat surface touch-screen region.

10. The device of claim 9, wherein the electronic device determines that the border between the flat surface touch-screen region and the curved surface touch-screen region is traversed from the second direction when the flat surface touch-screen region is touched in a predetermined time after the curved surface touch-screen region is touched.

11. The device of claim 1, wherein the first user command corresponds to an image zoom-in command and the second user command corresponds to an image zoom-out command.

12. The device of claim 1, wherein the first user command corresponds to a lock command, and the second user command corresponds to an unlock command.

13. A method of operating an electronic device that includes a flexible touch-screen unit and a body unit to which the flexible touch-screen unit is attached, the flexible touch screen unit including a display device and a touch sensor device, and the touch sensor device including a flat surface touch-screen region and a curved surface touch-screen region having a border between the flat surface touch- screen region and the curved surface touch-screen region, wherein an image is displayed through the flat surface touch-screen region and the curved surface touch-screen region, the method comprising:
determining that a first user command is input when the border between the flat surface touch-screen region and the curved surface touch-screen region of the flexible touch-screen unit is traversed from a first direction; and
determining that a second user command is input when the border between the flat surface touch-screen region and the curved surface touch-screen region is traversed from a second direction, the second direction being opposite to the first direction.

14. The method of claim 13, wherein the first direction corresponds to a direction from the flat surface touch-screen region to the curved surface touch-screen region.

15. The method of claim 14, wherein the border between the flat surface touch-screen region and the curved surface touch-screen region is determined to be traversed from the first direction when the curved surface touch-screen region is touched in a predetermined time after the flat surface touch-screen region is touched.

16. The method of claim 13, wherein the second direction corresponds to a direction from the curved surface touch-screen region to the flat surface touch-screen region.

17. The method of claim 16, wherein the border between the flat surface touch-screen region and the curved surface touch-screen region is determined to be traversed from the second direction when the flat surface touch-screen region is touched in a predetermined time after the curved surface touch-screen region is touched.

18. The method of claim 13, wherein the first user command corresponds to an image zoom-in command and the second user command corresponds to an image zoom-out command.

19. The method of claim 13, wherein the first user command corresponds to a lock command, and the second user command corresponds to an unlock command.

* * * * *